United States Patent
Tennakoon et al.

(10) Patent No.: US 10,101,804 B1
(45) Date of Patent: Oct. 16, 2018

(54) CONTENT INTERACTION SYSTEM AND METHOD

(71) Applicant: Z5X Global FZ-LLC, Dubai (AE)

(72) Inventors: Chamli Tennakoon, New York, NY (US); Subhash Chandra, Dubai (AE); Amit Goenka, Duabi (AE)

(73) Assignee: Z5X Global FZ-LLC, Dubai (AE)

( * ) Notice: Subject to any disclaimer, the term of this patent is extended or adjusted under 35 U.S.C. 154(b) by 0 days.

(21) Appl. No.: 15/629,621

(22) Filed: Jun. 21, 2017

(51) Int. Cl.
*A63J 25/00* (2009.01)
*G06F 3/01* (2006.01)
*G06F 3/16* (2006.01)

(52) U.S. Cl.
CPC ............. *G06F 3/011* (2013.01); *G06F 3/016* (2013.01); *G06F 3/16* (2013.01)

(58) Field of Classification Search
None
See application file for complete search history.

(56) References Cited

U.S. PATENT DOCUMENTS

| | | | | |
|---|---|---|---|---|
| 3,628,829 | A * | 12/1971 | Heilig | A47C 1/12 297/180.14 |
| 8,447,824 | B2 | 5/2013 | Hong et al. | |
| 2004/0015983 | A1 * | 1/2004 | Lemmons | H04N 5/44 725/12 |
| 2006/0017654 | A1 | 1/2006 | Romo | |
| 2006/0084050 | A1 | 4/2006 | Haluck | |
| 2007/0126927 | A1 * | 6/2007 | Yun | A63J 5/00 348/473 |
| 2009/0094520 | A1 * | 4/2009 | Kulas | G06F 17/30056 715/723 |
| 2009/0171902 | A1 | 7/2009 | MacLaurin et al. | |
| 2010/0077261 | A1 | 3/2010 | Jung et al. | |
| 2010/0195974 | A1 * | 8/2010 | Zheng | H04N 5/76 386/343 |
| 2010/0277469 | A1 | 11/2010 | Borrel et al. | |
| 2011/0296318 | A1 | 12/2011 | Takayama et al. | |
| 2013/0002405 | A1 | 1/2013 | Pesonen et al. | |
| 2013/0339433 | A1 * | 12/2013 | Li | G06K 9/00 709/204 |
| 2014/0248033 | A1 * | 9/2014 | Hung | G11B 31/00 386/234 |

(Continued)

FOREIGN PATENT DOCUMENTS

| | | |
|---|---|---|
| CN | 103761667 | 4/2014 |
| CN | 104881123 | 9/2015 |
| CN | 104881123 A | 9/2015 |

(Continued)

OTHER PUBLICATIONS

Cyrano is the digital scent speaker designed to improve your mood (3 pages).

(Continued)

Primary Examiner — Jennifer N To
Assistant Examiner — Beau D Spratt
(74) *Attorney, Agent, or Firm* — DLA Piper LLP (US)

(57) ABSTRACT

A content interaction system and method allow a user to simultaneously interact with a piece of content using the five senses (touch, sound, sight, smell and taste) of the user. In one embodiment, the content interaction system may have a plurality of devices wherein the user may integrate one or more of the devices together.

17 Claims, 9 Drawing Sheets

(56) References Cited

U.S. PATENT DOCUMENTS

2014/0267903 A1* 9/2014 Gairns .................. A63J 25/00
348/460
2014/0324222 A1 10/2014 Chee et al.

FOREIGN PATENT DOCUMENTS

WO        WO 01/96996        12/2001
WO        WO 06/013363      2/2006

OTHER PUBLICATIONS

Visual Commerce—The Virtual Products Platform (11 pages).
Natural Machines retrieved from the web at https://www.naturalmachines.com/ dated May 10, 2018 (4 pgs.).
Ultrahaptics home webpage—retrieved from the web at http://www.ultrahaptics.com/ dated May 5, 2018 (2 pgs.).
OnNotes home webpage—retrieved from the web at https://onotes.com/ dated May 10, 2018 (7 pgs.).
Samsung home webpage—retrieved from the web at https://www.samsung.com/us/mobile/virtual-reality/gear-vr/gear-vr-sm-r322nzwaxar/ dated May 10, 2018 (19 pgs.).
Oculus Rift home webpage—retrieved from the web at http://www.oculus.com/rift/#oui-csl-ift-games=mages-tale dated May 10, 2018 (19 pgs.).
Srivastava, Tavish; entitled Introduction to K-Nearest Neighbors: Simplified (with implementation in Python) dated Mar. 26, 2018—retrieved from the web at http://www.analyticsvidhya.com/blog/2018/03/introduction-k-neighbours-algorithm-clustering/ (29 pgs.).

* cited by examiner

CONTENT INTERACTION SYSTEM AND METHOD

FIELD

The disclosure relates generally to a system and method for interacting with content using the five human senses: touch, smell, sound, sight and taste.

BACKGROUND

A human being has six different senses by which the human being can sense an environment including touch sensed by various parts the human body and mind. Those six senses include: 1. Eyes—for consuming all what you capture through this sense organ. 2. Ears—What we hear. 3. Nose—What we smell. 4. Mouth—what we eat and taste and $5^{th}$ our Skin—Through the touch we feel; and the $6^{th}$ Sense Organ, which is the Mind.

Existing content systems, such as typical television, movies, etc., typically allow a user to experience the content through the sight and sound senses. Other systems may allow the user to experience the content by the smell sense or the taste sense. Furthermore, there are existing systems that allow user to experience the content via the touch sense such as a haptic feedback system. None of the known content systems integrate all five senses into a device to provide a unified 5 senses content experience. Thus, a technology problem of the existing systems is that none of those systems provide integrated five sense content interaction. While systems exist that individually allow a user to interact with content using the five different senses, no one to date has actually integrated all of those systems together which is not trivial since each of the existing systems do not necessarily communicate with each other.

DETAILED DESCRIPTION OF ONE OR MORE EMBODIMENTS

The disclosure is particularly applicable to a video on-demand set-top system that plays video content to any screen. It is in this context that the disclosure will be described. It will be appreciated, however, that association of five senses with the content in accordance with the invention has greater utility, such as to a virtual software only system without any hardware solely communicating with third party hardware devices. In one embodiment, the system and method may cater to the first five senses: eyes, ears, nose, mouth and skin. In another embodiment, the system and method may cater to all of the six senses since the mind is more complicated that the other senses.

The system and method may provide an ultimate connected device in the living room of the consumer to enhance the entertainment, shopping and education experience of the user. The entertainment devices or applications available currently in the market do not cater to all 5 senses of the human while the disclosed system and method caters to all five senses together or individually as the consumer prefers, by integrating modules/devices designed to cater to each of the five senses. The system and method integrates devices for each of the five senses into a unified experience based on what's required for the content.

Figure 9:
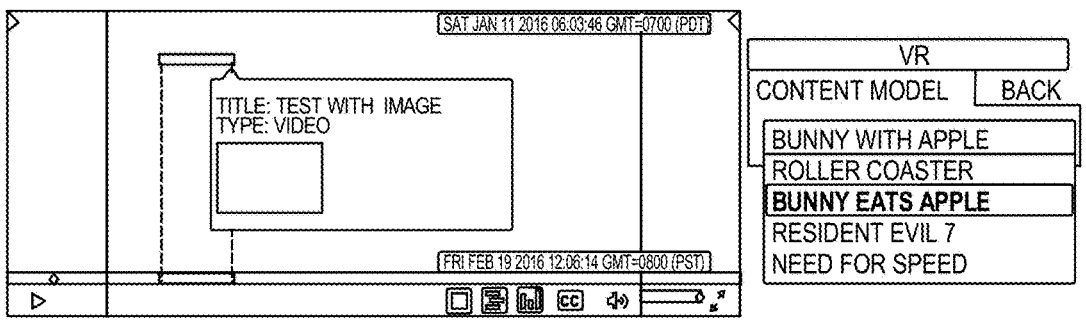
FIG. 9 illustrates an example of the Hot Spotting Screen, where the video content is mapped with Hot Spots of different sense experiences.

In one embodiment, the system may encode the piece of content with markers that time-codes the video content for different senses with sense bugs. Thus, the system may use these time codes to synchronize the various five or six senses and the interaction by the user using the five or six senses depending on the embodiment of the device. A user will have the ability to create new content or import existing $3^{rd}$ party content into a cloud based portal interface that is part of an interactive content delivery system 106 that is part of the overall system 100. Once the content is loaded into the portal interface, the portal interface may provide the capability to move across various frames and scenes of the content and hotspot the relevant sections with associated sense bugs. As shown in FIG. 9, elements 900/901 are a user interface system that provides the ability to attach (hotspot) a sense experience to a scene or a segment of content. The drawing 902 shows how various sense hotspots are attached and tracked to the video content. The system may use a dynamic cloud based synchronization technique to attach and store these hotspots to the content. Once the hotspots are associated with the relevant sections of the content with the sense bugs (as described below), this configuration of the content (with the timestamps, hotspots and sense bugs for particular scenes) may be stored on the cloud platform (such as in the storage element 106C that is part of the interactive content delivery system 106) associated as a time-code association to the third-party content or the uploaded original content. When such a piece of sense encoded content is played by a device 102, such as an intelligent video player, the device 102 shown in FIG. 1 may extract the sense bug for the appropriate scene/frame and display the visual indicator on the screen. In the system, the user can interact with the sense bug to activate the sense bug to experience the additional dimension/sense of the content. Some of the sense bug may be involuntary—for example, a scent bug activates involuntarily on its own based on the scent map and the scent graph without having to have the user interact with the system. Sense bugs that do not require a user input or action will be executed involuntarily. For example, when a smell bug is encountered, the device 102 may message the smell hardware module 104B to automatically disperse that corresponding smell and that smell will be mixed accordingly and dispersed. On the other hand a sense bug involving touch will need the user to be close to the system and only activated when the user is ready.

In one embodiment, the system may have different modules/devices for each of the senses which could work together or individually as a standalone system. Each of the modules has one or more connectors that transfer power and data between the modules/devices once the modules/devices are stacked on top of each other. There are multiple possible combinations of these systems.

The interactive content system and method may be used to generate/drive revenues in various manners. For example, in the system and method, a base device (for example a user interaction device 102 in FIG. 1) may be sold to a consumer who is going to interact with the content being delivered to/stored in the base device. The system may then have one or more additional sense devices (devices 104A-104E in the example in FIG. 1) that may be sold separately from the base device or subsidized by an advertiser and may be sold by the company that also sells the base device or by the advertiser. For example, in one embodiment, a smell device 104B that generates a smell response based on the interactive content (such as for example a smell cartridge) or a taste device 104C (such as a 3D food printer cartridge) may be initially sold by a third party or a vendor in the market. In the system, an advertiser 108 may brand and pay for advertisements in the interactive content that may generate a response from one or more of the sense devices 104A-104E. For interactive content that may be a movie production, an advertising brand may pay for placement of logos, branded content, etc.

Figure 1:
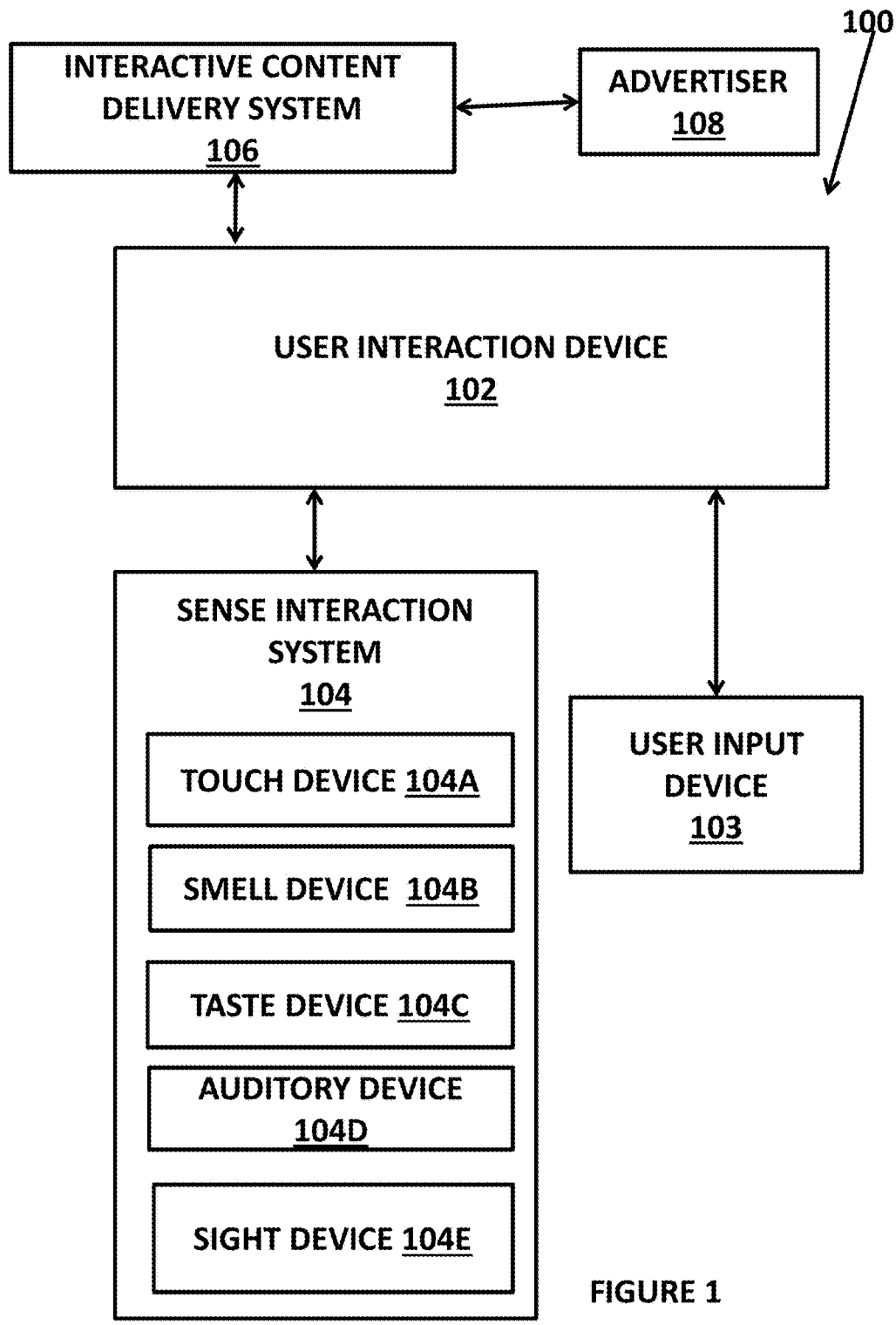
FIG. 1 illustrates a content interaction system and method.

FIG. 1 illustrates a content interaction system and method 100 by which a user that has access to the user interaction device 102 may interact with content using one or more or all of their five human senses (e.g., sight, touch, smell, taste and sound). The system 100 provides a unified user experience that caters to all the five human senses. The system may have a plurality of user interaction devices 102 wherein each user interaction device 102 may be used by one or more users to interact with the content using the five human senses. Each user interaction device 102 may be, for example, any device (base device) by which a user may interact with the content using one or more of the five senses. In one example, each device 102 may be a television that allows the user to interact with the content using sight and sound senses and the user interaction device 102 may have one or more other sense devices (such as a smell device 104B, a taste device 104C and a touch device 104A) connected to the user interaction device so that the user can interact with the content using the five human senses. In other embodiments, the user interaction device 102 may have each of the five sense devices built into the user interaction device 102. In yet other embodiments, the user interaction device 102, may have some but not all the sense devices built into the user interaction device 102. Thus, the user interaction device 102 may be any device that may be used by a user to interact with content and may be hardware, software or a combination of both. As shown in FIG. 1, each user interaction device 102 may further comprise a user input device 103 (in addition to the sense devices) that allow the user to interact with the user interaction device 102, such as a remote device for activating the user interaction device 102 or changing the volume of the user interaction device 102.

The system 100 may further comprise an interactive content delivery system 106 that receives content and encodes the five sense interactive content that is delivered to each user interaction device 102. The interactive content delivery system 106 may be implemented using a server computer, other hardware devices or software (a plurality of lines of computer code) or a combination of hardware and software. As part of the encoding process (described below in more detail), the interactive content delivery system 106 may generate one or more timespots/markers and insert them into the content to indicate when one or more of the sense devices should be activated when the content is played on the user interaction device 102. Further, one or more advertisers 108 may connect to the interactive content delivery system 106, submit one or more advertisements and pay for the one or more advertisements to be associated with certain timespots/markers (and thus certain sense devices and sense interactions) in the content being delivered to each user interaction device 102. For example, a food company may pay for its advertisements to be associated with markers for the smell or taste sense devices. This provides one mechanism by which the sense interactive content experience may be monetized.

In the embodiment of the system in FIG. 1, the user interaction device 102 may have a sense interaction system 104 that is coupled to the user interaction device 102. As described above, other embodiments of the system may have one or more of the sense devices 104A-104E embedded in the user interaction device 102. Each of the sense devices may generate a different sense interaction so that the touch device 104A may provide a touch sense interaction, the smell device 104B may provide a nasal sense interaction, the taste device 104C may provide an oral interaction, the auditory device 104D may provide an audible interaction and the sight device 104E may provide a visual interaction. As described above, each of the sense devices may be triggered by a marker/timespot in the content wherein the content may include a unique marker/timespot to separately trigger each of the sense devices 104A-104E. In some embodiments, the sense interaction system 104 may further include a mind interaction device that is not shown in the example in FIG. 1 that is a five sense interaction device. For example, the content may display an edible product and have a timespot to trigger the taste device 104C to generate the displayed edible product. Each device 104A-104E may be housed in a single housing (as shown in FIG. 1) or each sense device 104A-104E may be housed in different modules/housings that may be stacked/coupled to each other. Thus, the above exemplary system contains multiple physical subsystems that can be separated or combined as a single unit, which when separated can be in near proximity to the consumer to create the optimal experience (Ex: Smell sensor or Touch Sensor). Once combined, the sense devices can operate together as a single unit. Thus, for example, an initial system for a particular user may have only 1-2 of the sense devices and then the user can purchase/acquire the additional sense devices and each user may have a different number of sense devices that can be triggered although the delivered interactive content may have the markers/timespots for each of the sense devices.

Each of the sense devices may be implemented as a combination of hardware and software. In one example, the touch device 104A may be a haptic feedback device, the smell device 104B may be a device that generates a particular smell in response to activation, the taste device 104C may be a device that generates food in response to activation (such as a 3D food printer/microwave oven), the auditory device 104D may generate audible interactions in response to activation (that may be the speakers of a television in some embodiments) and the sight device may generate visual interactions in response to activation (that may be the screen of a television in some embodiments). Each of the sense interaction devices 104A-104E may be a custom made device or it may be an off the shelf product that is commercially available. For example, a commercially available digital smell sensor (that may be used for the smell sense device 104B) may be the Cyrano product that is available from Vapor Communications, now called onotes, inc. (further information is available at onotes.com/ that is incorporated herein by reference). As another example, the touch sense device 104A may be implemented using a commercially available product from UltraHaptics (further information is available at www.ultrahaptics.com/ that is incorporated by reference herein). As another example, the taste sense device 104C may be implemented using a commercially available Foodini product made by Natural Machines, Inc. (further information is available at www.naturalmachines.com/that is incorporated herein by reference). The auditory capabilities are provided by standard High Definition sound processing systems built into the set-top-box. The resulting audio is played by the consumer's speakers systems. The visual capabilities are played back by the TV systems. However enhanced virtual reality experiences are created on $3^{rd}$ party VR head set systems such as (but not limited to) Samsung Gear VR (www.samsung.com/us/mobile/virtual-reality/gear-vr/gear-vr-sm-r322nzwaxar/) or Oculus Rift (www.oculus.com/rift/).

Alternatively to the embodiments described above, the system 100 may be implemented using the user interaction device 102 that includes software that runs on commodity set top boxes (STBs) or USB sticks and the sense devices 104 may be appropriate hardware (for instance, a 3rd party smell sensor) it can interact with it and create a similar immersive experience.

For the smell sense device 104B, the marker/hotspot associated with a smell sense may be associated with the content, either mapped one-on-one based on the scenes in the content or based on a scent graph that is derived on a user's scent preferences and the associated contents' smell map. A sense map or guide will be created that will be associated with the content based genres and other attribute preferences. Alternatively, the sense of smell feature may have theme centric content scent graph and scent map created, which would merge together to create a scent palette while the content is being played. The scent graph indicates the intensity of the scent and scent map defines where a particular scent trigger is activated in a particular content. The smell sense device 104B may have an import/export option that may be embedded into the video editor that identifies hotspots in the content.

In one embodiment, the touch sense device 104A (digital touch capability) may be based on ultrasound technology and can emulate or simulate tactile feedback based on the object depicted on the content. For example, in a movie with scenes of large monuments or buildings, the tactile feedback can also emulate the feeling of touching the miniature form of the building and this experience is created in real-time.

In more detail, the interactive content delivery system 106 may retrieve/obtain a piece of content (such as a video or other piece of content) and this content could be uploaded into the platform or the video links could be pulled from external systems such as YouTube, Vimeo and Netflix and others. The interactive content delivery system 106 may be a cloud platform that is a part of the system that will provide the ability to mark (hotspot) video frames with the additional sensor icons (bugs). When the marked content is played through the above system it will create the associated marked immersive experience. For example when a video is played, the system will detect the marker on the sequence of video frames and will visibly show on the screen the "sense bug" and will activate the appropriate sensor to create the digital smell or digital touch that is associated with the device. A key innovation is that the marker technology is external to any video content thus enabling any/all 3rd party video content to be marked so that a sense interactive piece of content may be generated from any piece of content.

In addition to the elements shown in FIG. 1, the system 100 may further include a neuroscience helmet that may be used to identify and capture heightening pulse or a spike in pulse of the user based on the user's interest. This data from this device may be used to determine a user's interest in each piece of particular content.

In the system 100, the markers may be automatically activated as the piece of interactive content is being played on the user interaction device 102 as described above. Alternatively, each marker for a particular sense interaction may be activated by the user's input based on the nature of the solution. For example, sense of smell trigger will activate automatically, while a touch sense (such as a virtual reality system) may be activated based on the user's selection.

In one embodiment, the user input device 103 may be a gesture-based sensory input device where the user will interact with the system. This will enable the consumer to select options to control the user interaction device 102 along with the virtual reality experience.

The touch sense device 104A may be a virtual reality (VR) device. The system may have, but not limited to, mobile VR capability, assuming the content has a marker for VR world or a VR scene and the scene will be marked to the content. In one embodiment, when a VR marker is played, the "scene bug" will appear and the user has the ability to transfer the screen from a large screen device to a mobile Z5 app and that will immediately display the VR content on the VR device. The user may have the ability to insert the device into his VR gear and view the VR world. The mobile application is smart enough to pause and resume the playback on the main Z5 system while the VR content is being viewed on the headset. The "Scene Bug" screen can also appear in the VR mobile app or a VR system and there are seamless handovers between the Z5 device and the mobile app or the VR system on the sessions. The interactive VR transfer between devices (mobile & TV) can be enabled like a phone call transfer between the mobile and car bluetooth technology and can also be used to socially transfer content to friends while watching.

The taste device 104C may be a 3D printer that is a part of its main system or a 3rd party system. If a 3D print marker is present based on the content, it has the ability to print the desired food item. In the system, the culinary content is associated with the marker and based on featured culinary shows. The selected items will be printed by the device—during the show and post the show. The system is intelligent to understand the time it takes to print items and will perform pre-preparation or printing so the item is ready during the show. For example, for busy parents can time the printing of cookies and snacks for kids when they come from school remotely after their TV time. The system may also have partnerships with advertisers and brands to create token food items to entice consumers during after or in between commercials.

Figure 2:
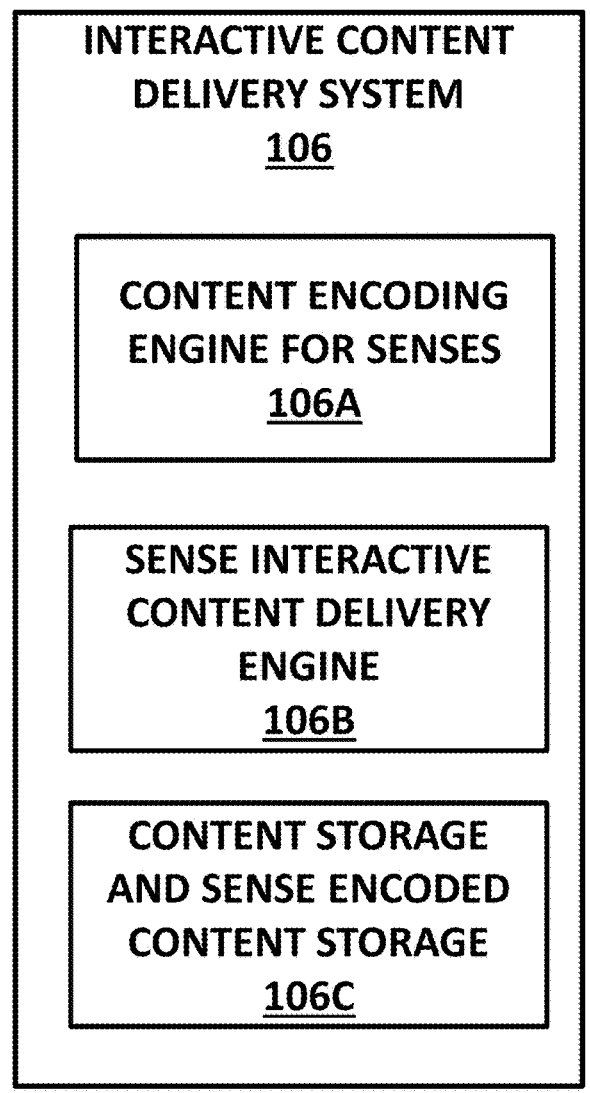
FIG. 2 illustrates more details of the interactive content delivery system that is part of the content interaction system.

FIG. 2 illustrates more details of the interactive content delivery system 106 that is part of the content interaction system 100. The interactive content delivery system 106 may further include one or more additional elements and each of these elements of the interactive content delivery system 106 may be implemented in hardware or software. When an element is implemented in hardware, each element may be hardware device, a specialized microcontroller and the like. When an element is implemented in software, the element may be a plurality of lines of computer code/ instructions that may be stored in a memory and executed by a processor of the cloud resources that host the element (blade server, server computer, cloud computing resource, etc.) so that the cloud resource/computer system is configured to perform the operations and processes of that element. The interactive content delivery system 106 may further include a content encoding engine for senses 106A, a sense interactive content delivery engine 106B and a content storage and sense encoded content storage 106C. The content encoding engine for senses 106A performs the encoding of a piece of new content or third party content with the timestamps, hotspots and sense bugs at different scenes in the content to make that content sense interactive. For example, the content encoding engine for senses 106A may provide a tool/user interface that allows an authorized user to edit/encode the content (whether new content or third party content) with the timestamps, hotspots and sense bugs. The sense interactive content delivery engine 106B may deliver, based on the content being viewed by the user, the appropriate sense encoded content to each user of the system 100 over a communications path that may be wired or wireless. The content storage and sense encoded content storage 106C may store the raw content (whether new content or third party content) and the sense encoded content so that the raw content may be encoded by a user of the system and the sense encoded content may be delivered to each device 102 of the system.

Figure 3:
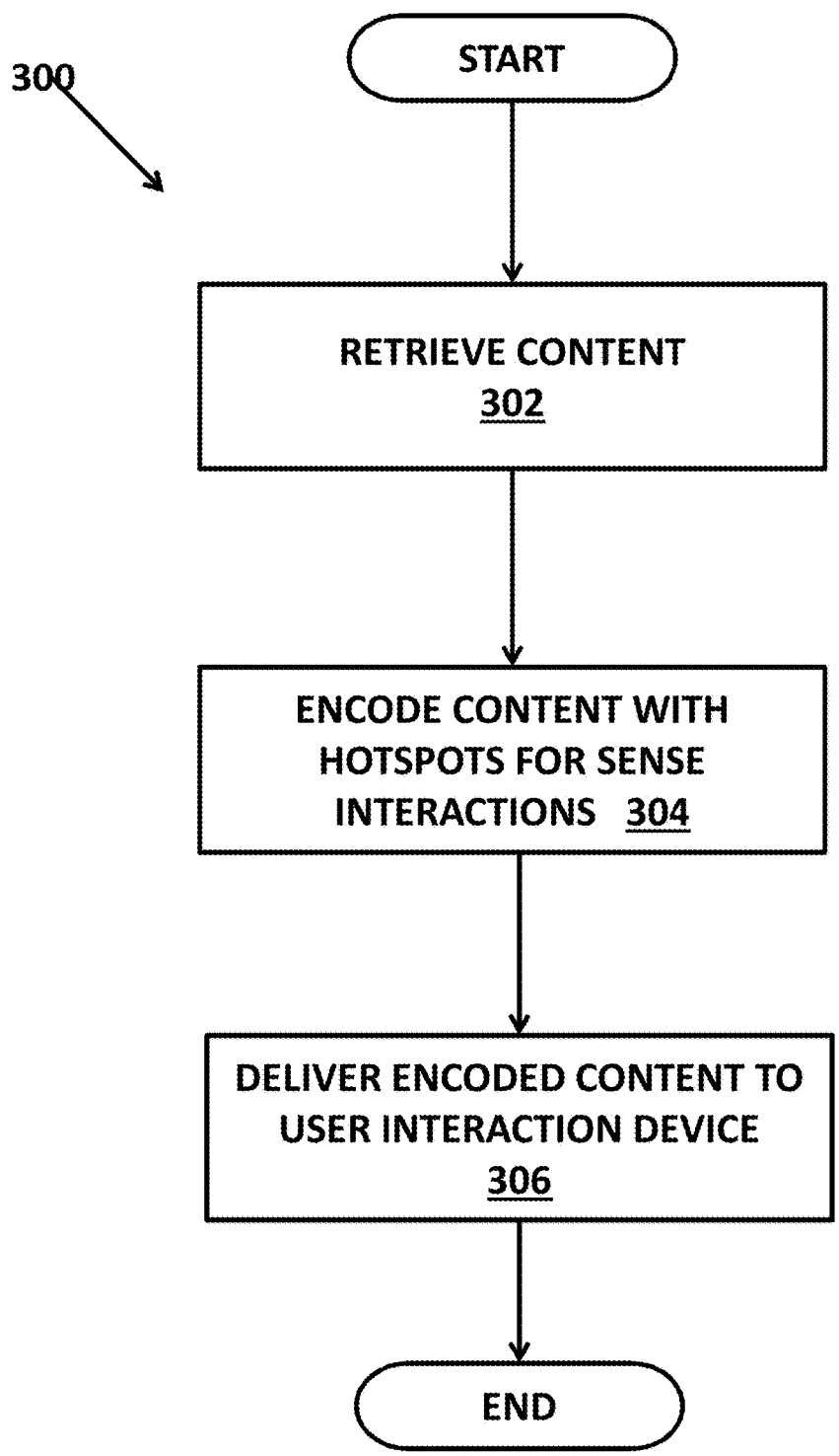
FIG. 3 illustrates a method for generating sense based interactive content.

FIG. 3 illustrates a method 300 for generating sense based interactive content. In one example, the above described content encoding engine for senses 106A may be used to perform this method. However, the method 300 may also be performed using different/other hardware that would be within the scope of the disclosure. In the method, content is retrieved (for third party content) or generated (for new content) (302). The content is then encoded with the timestamps, hotspots and sense bugs (304) for one or more scenes of the content to encode the different sense interactive into the piece of content. Each hotspots and/or sense bug may include data about which sense device is being triggered and what response is expected from the sense device. For example, a hotspot for the smell sense device may include data/instructions about a particular smell to be generated by the smell sense device. Similarly, the hotspots and/or sense bugs for the other sense devices would have similar data. The method may then delivery the sense encoded content to each user interaction device 102 (306).

Figure 4:
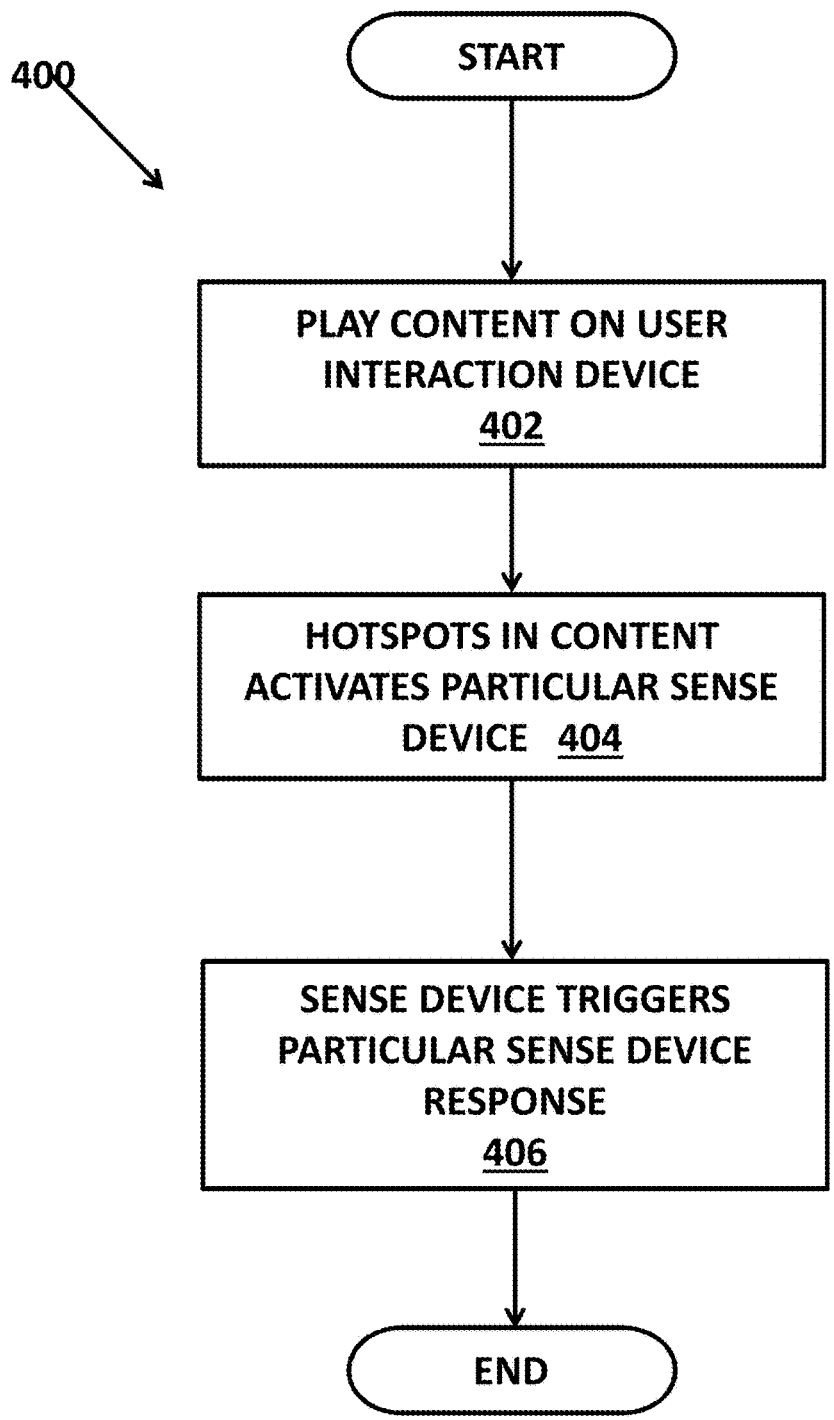
FIG. 4 illustrates a method for interacting with the sense based interactive content.

FIG. 4 illustrates a method 400 for interacting with the sense based interactive content. In one example, this method may be performed by a combination of the user interactive device 102 and the sense interaction system 104. However, the method 300 may also be performed using different/other hardware that would be within the scope of the disclosure. In the method, a particular piece of encoded content may be played on the user interaction device 102 (402). As described above, the hotspots and sense bugs embedded into the content may be involuntarily triggered or triggered by a user action. Thus, the hotspots in the content may activate a particular sense device (404) and the particular sense device may generate a response (406). For example, for the smell sense device, the sense device may emit a smell based on the hotspots or sense bug.

Figure 5:
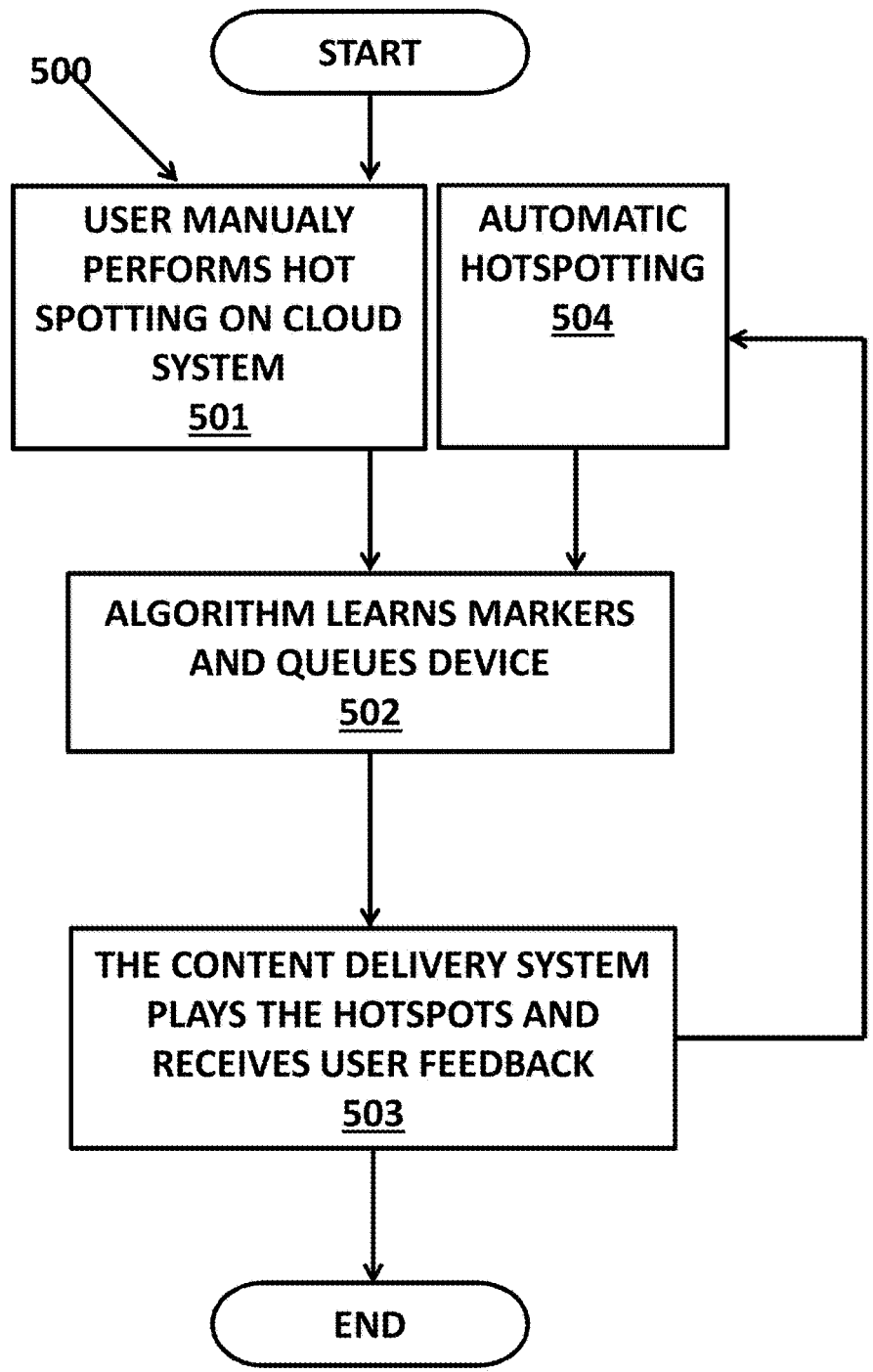
FIG. 5 illustrates an example of a technique for learning and automatically hot spotting content with scent, virtual reality and touch elements.

FIG. 5 illustrates a method 500 for learning and automatically hot spotting content with scent, virtual reality and touch elements. The user may initially perform manual hotspotting (manually insert the hotspots in the content) using the system (501) as described above. As the content system (503) is learning and getting feedback from the user about the user inserted hotspots, the system may learn (using an algorithm or machine learning techniques) to provide automatic hotspotting (504) in addition to the manual hotspotting. In one embodiment, an algorithm (502), such as clustering algorithm, may learn the hotspots and markers and then automatically queues the sense devices so that the device 102 and sense system 104 may encode, on the fly, a piece of content instead of required previously encoded sense content. This type of learning and automatic hot spotting is possible for all senses and not limited to Scent.

Figure 6:
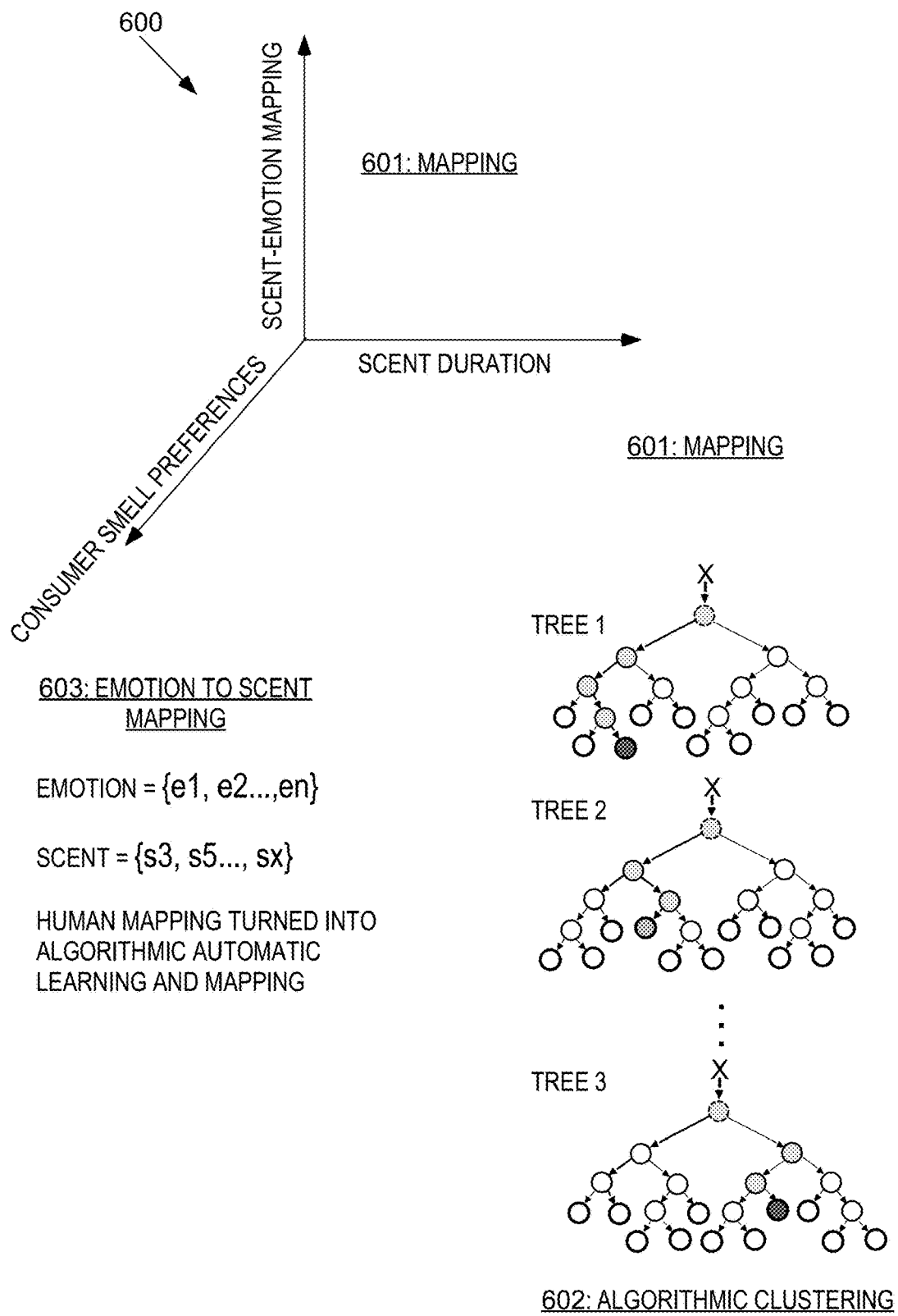
FIG. 6 illustrates an example of mapping technology employed by the system to connect scent elements with the scenes of the video content.

FIG. 6 illustrates an example of mapping technology 600 employed by the system to connect scent elements with the scenes of the video content. Thus, FIG. 6 illustrates an example of the algorithm 502 referenced above with respect to FIG. 5 that may be used for the automatic hotspotting. It is noted that the system may have similar processes/method for automatic hotspotting for the other sense devices. The algorithm may perform a mapping 601 in which the system considers three elements to make a judgment on what duration at which to play any give scent. As shown, each scent may be mapped to an emotion on any given content. A subset from the list of human emotions as shown on the link (simple.wikipedia.org/wiki/List_of emotions#/media/File:Plutchik-wheel.svg) are captured for across a content. These emotions are manually mapped by an administrator or a consumer on the cloud based portal. However, after learning the mapping and gathering statistically significant information the system, the algorithms will map the emotion, scent and duration tuples 601 into a clustering algorithm 602 that performs a range of cluster techniques such as random forest and K-nearest neighbors etc. on that data to determine suitable scent tuples for any given emotion sets. It is also possible to tag emotions via speech recognition of the audio track or the convolutional techniques employed on video the goal is to achieve scale. The resulting system, for example, may map the emotion [Happy] with the smell [Lavendar]. This mapping is derived via learning from all the thousands of manual mapping that is done across various videos. The value of the automated clustering is not just determining the mapping of a single emotion to a single smell but rather its sequence its neighboring emotions and its neighboring smells. We use a nearest neighbor clustering algorithm similar to described in the below link(www.analyticsvidhya.com/blog/2014/10/introduction-k-neighbours-algorithm-clustering/) with feedback and the ability incorporate learned and derived behavior.

Figure 7A:
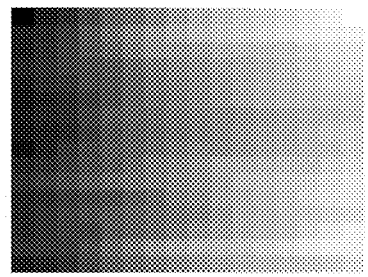
FIGS. 7A-7C illustrate examples of the device form factors, components and possible colors for production.
Figure 7B:
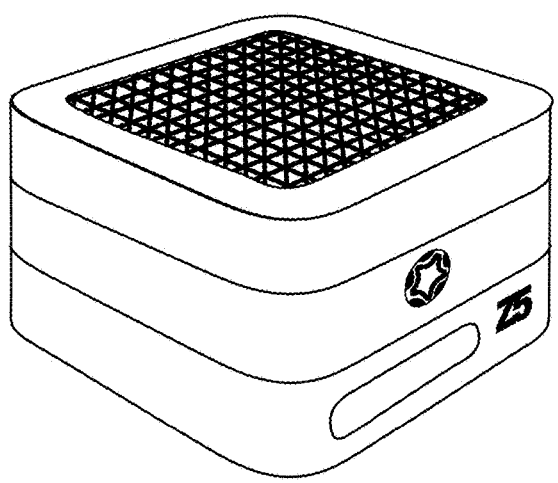
Figure 7C:
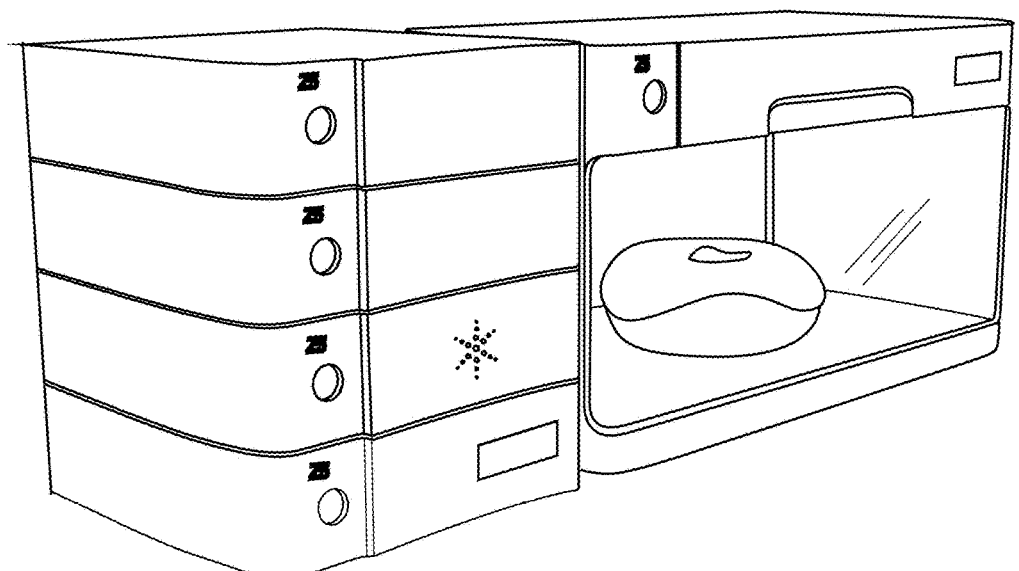

FIGS. 7A-7C illustrate examples of the device form factors, components and possible colors for production. For example, FIG. 7A illustrates all of the different colors that may be used for the user interface device 102, the sense system 104 and/or each of the individual sense devices 104A-104E as shown in FIG. 1. FIG. 7B illustrates another example of the sense system 104 with three sense device modules stacked on top of each other that may also include an external 3D Printer for the taste sense device 104C. FIG. 7C illustrates yet another example of the sense system 104 with four sense device modules stacked on top of each other and an attached 3D Printer for the taste sense device 104C. In accordance with this disclosure and as described above, many different configurations of the sense devices are possible and the system is not limited to any particular configuration.

Figure 8:
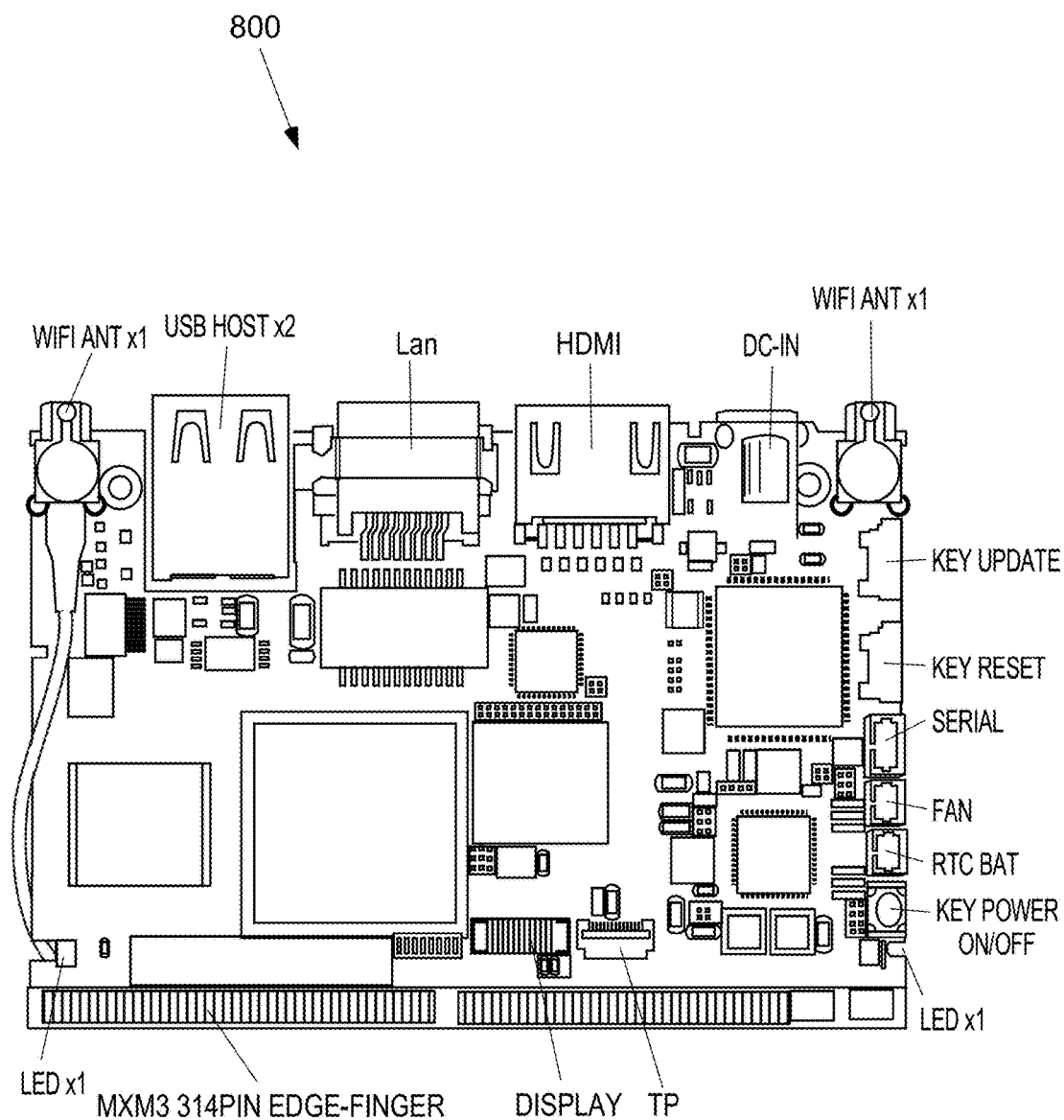
FIG. 8 illustrates the baseboard—content delivery system hardware with logical components.

FIG. 8 illustrates the baseboard 800—content delivery system hardware with logical components. The video (Visual)/playback sense system is central to the system and may be referred to as the "Base", an example of which is shown in FIG. 8. The Base 800 may contain the necessary power and charging mechanisms for the other systems and various hardware elements shown in FIG. 8. The base may also contain an intelligent video player that can extract the sense bug associations and disperse commands to other systems and sense devices. The base can exist in the form of hardware or software. The smell and the touch systems can be stacked on top of the base and charged by inductive touchless mechanism or a touch based power connector. The 3D food printing component is adjacent can will be powered by the above mechanism. The 3D food printing component may also be in the kitchen and communicate via WIFI with the home connected device. They communicate through a proximity protocol such as Bluetooth low energy or a discoverable WIFI nodes. The system works individually and syncs with the rest of the module once stacked on top of each other. The base system performs a discovery routinely for its own sense hardware components or associated $3^{rd}$ party hardware components. When a scan detects a device it is automatically asked to join and depending on the security privileges the joining operation is authorized.

The configuration of the system 100 and the sense system 104 may be, for example:
- Base System Software Only running on a $3^{rd}$ party set top box and detecting $3^{rd}$ party sense devices
- Base System Hardware and software detecting and communicating to all other sense devices that are $3^{rd}$ party supplied.
- Based System and few own sense devices along with $3^{rd}$ party devices
- A full suite of owned system that has all contains the base and all sense systems The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A content interaction system, comprising:
an interactive content delivery system that stores a plurality of pieces of interactive content and delivers at least one piece of interactive content to a user device, each piece of interactive content having a plurality of sense markers distributed through the piece of interactive content, the sense markers including a touch sense marker indicating a piece of content within the interactive content having a touch sense interaction opportunity, a smell sense marker indicating a piece of content within the interactive content having a smell sense interaction opportunity, a taste sense marker indicating a piece of content within the interactive content having a taste sense interaction opportunity, an auditory sense marker indicating a piece of content within the interactive content having an auditory sense interaction opportunity and a sight sense marker indicating a piece of content within the interactive content having a sight sense interaction opportunity, each sense marker being activated by a user interaction with each particular sense marker distributed through the piece of interactive content;
the interactive content delivery system further comprising a content encoder engine that retrieves a piece of content and encodes the plurality of sense markers for the piece of content to generate at least one piece of interactive content;
the user device having a display that displays the piece of interactive content to a user and a device that allows the user to activate the particular sense marker;
a sense interaction system coupled to the user device that, in response to the particular sense marker in the interactive content being activated, triggers a sense response that is interacted with by the user, wherein the sense response is two or more of a touch sense response, a smell sense response, a taste sense response, an auditory sense response and a sight sense response;
wherein the sense interaction system further comprises a touch sense device that is synchronized to the touch sense marker in the interactive content so that the user interacts with the interactive content using the sense of touch, a smell sense device that emanates a signal that is synchronized to the smell sense marker in the interactive content so that the user interacts with the interactive content using the sense of smell, a taste sense device that emanates a signal that is synchronized to the taste sense marker in the interactive content so that the user interacts with the piece of content using the sense of taste, an auditory sense device that emanates a signal that is synchronized to the auditory sense marker in the interactive content so that the user interacts with the piece of content using the sense of hearing and a sight sense device that emanates a signal that is synchronized to the sight sense marker in the interactive content so that the user interacts with the piece of content using the sense of sight, wherein each device has a separate housing and is coupled together; and wherein each sense device automatically maps the sense associated with the sense device onto a scene of the interaction content.

2. The system of claim 1, wherein the sense interaction system further comprises a smell sense device that emanates a signal that is synchronized to the smell sense marker in the interactive content so that the user interacts with the interactive content using the sense of smell.

3. The system of claim 1, wherein the sense interaction system further comprises a touch sense device that generates a signal that is synchronized to the touch sense marker in the interactive content so that the user interacts with the interactive content using the sense of touch.

4. The system of claim 1, wherein the sense interaction system further comprises a taste sense device that emanates a signal that is synchronized to the taste sense marker in the interactive content so that the user interacts with the piece of content using the sense of taste.

5. The system of claim 1, wherein the sense interaction system is embedded into the user device.

6. The system of claim 1, wherein each sense device generates a tuple that maps the sense associated with the sense device onto a scene of the interaction content and a duration of the sense response.

7. The system of claim 1, wherein the sense interaction system automatically generates a sense marker in the piece of interaction content.

8. The system of claim 1, wherein the interactive content delivery system further comprises a user interface element that generates one or more sense markers that are embedded into the piece of interactive content.

9. A sense based interactive display device, comprising:
a user device having a display that displays a piece of interactive content to a user, the piece of interactive content having a plurality of sense markers distributed through the content of the piece of interactive content, the sense markers including a touch sense marker indicating a piece of content within the interactive content having a touch sense interaction opportunity, a smell sense marker indicating a piece of content within the interactive content having a smell sense interaction opportunity, a taste sense marker indicating a piece of content within the interactive content having a taste sense interaction opportunity, an auditory sense marker indicating a piece of content within the interactive content having an auditory sense interaction opportunity and a sight sense marker indicating a piece of content within the interactive content having a sight sense interaction opportunity, each sense marker being activated by a user interaction with each particular sense marker in the piece of interactive content;
a content encoder coupled to the user device that retrieves a piece of content and encodes the plurality of sense markers for the piece of content to generate the piece of interactive content;
the user device having a device that allows the user to activate the particular sense marker; and
a sense interaction system coupled to the user device that, in response to the particular sense marker in the interactive content being activated, triggers a sense response that is interacted with by the user, wherein the sense response is two or more of a touch sense response, a smell sense response, a taste sense response, an auditory sense response and a sight sense response;

wherein the sense interaction system further comprises a touch sense device that is synchronized to the touch sense marker in the interactive content so that the user interacts with the interactive content using the sense of touch, a smell sense device that emanates a signal that is synchronized to the smell sense marker in the interactive content so that the user interacts with the interactive content using the sense of smell, a taste sense device that emanates a signal that is synchronized to the taste sense marker in the interactive content so that the user interacts with the piece of content using the sense of taste, an auditory sense device that emanates a signal that is synchronized to the auditory sense marker in the interactive content so that the user interacts with the piece of content using the sense of hearing and a sight sense device that emanates a signal that is synchronized to the sight sense marker in the interactive content so that the user interacts with the piece of content using the sense of sight, wherein each device has a separate housing and is coupled together; and wherein each sense device automatically maps the sense associated with the sense device onto a scene of the interaction content.

10. The device of claim 9, wherein the sense interaction system further comprises a smell sense device that emanates a signal that is synchronized to the smell sense marker in the interactive content so that the user interacts with the interactive content using the sense of smell.

11. The device of claim 9, wherein the sense interaction system further comprises a touch sense device that generates a signal that is synchronized to the touch sense marker in the interactive content so that the user interacts with the interactive content using the sense of touch.

12. The device of claim 9, wherein the sense interaction system further comprises a taste sense device that emanates a signal that is synchronized to the taste sense marker in the interactive content so that the user interacts with the piece of content using the sense of taste.

13. The device of claim 9, wherein the sense interaction system is embedded into the user device.

14. The device of claim 9, wherein each sense device generates a tuple that maps the sense associated with the sense device onto a scene of the interaction content and a duration of the sense response.

15. The device of claim 9, wherein the sense interaction system automatically generates a sense marker in the piece of interaction content.

16. The system of claim 1, wherein the piece of content is one of a new piece of content and a third party piece of content.

17. The device of claim 9, wherein the piece of content is one of a new piece of content and a third party piece of content.

* * * * *